US010780542B2

(12) United States Patent
Nakazawa

(10) Patent No.: US 10,780,542 B2
(45) Date of Patent: Sep. 22, 2020

(54) MOTOR AND SPINDLE PROTECTION STRUCTURE

(71) Applicant: FANUC CORPORATION, Yamanashi (JP)

(72) Inventor: Yasuyuki Nakazawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/166,809

(22) Filed: Oct. 22, 2018

(65) Prior Publication Data
US 2019/0126420 A1    May 2, 2019

(30) Foreign Application Priority Data
Oct. 26, 2017 (JP) ................. 2017-207084

(51) Int. Cl.
*B23Q 11/10* (2006.01)
*B23Q 1/70* (2006.01)
*F16J 15/16* (2006.01)

(52) U.S. Cl.
CPC .............. *B23Q 11/103* (2013.01); *B23Q 1/70* (2013.01); *B23Q 11/1015* (2013.01); *F16J 15/164* (2013.01)

(58) Field of Classification Search
CPC .......... H02K 7/08; H02K 15/16; B23Q 11/10; B23Q 11/101; B23Q 11/1015; B23Q 11/103; B23Q 17/00; B23Q 1/70; F16J 15/164; F16L 39/04; F16C 32/06; F16F 15/34; G11B 19/20
See application file for complete search history.

(56) References Cited

U.S. PATENT DOCUMENTS 5,235,228 A    8/1993  Nakanura et al.
5,967,716 A *  10/1999 Katsuzawa ............ B23Q 11/10
                                                    408/56

(Continued)

FOREIGN PATENT DOCUMENTS

JP          55080520 U    6/1980
JP       2002321138 A    11/2002
(Continued)

OTHER PUBLICATIONS

English Abstract for Japanese Publication No. 5980891 B2, published Aug. 31, 2016, 2 pgs.
(Continued)

*Primary Examiner* — Tran N Nguyen
(74) *Attorney, Agent, or Firm* — Fredrikson & Byron, P.A.

(57) ABSTRACT

A motor, to which a rotary joint supporting structure is attached, turns a spindle. The motor includes a motor housing, a rotary shaft that is hollow, the flinger that is integrally attached to the rotary shaft outside the motor housing, and a peripheral wall that is provided in the motor housing and projects in the axial direction of a spindle so as to surround the periphery of the flinger. The peripheral wall has cutouts in its side surface so as to establish communication between the interior and exterior of the peripheral wall, to thereby form protrusions projecting in the axial direction of the rotary shaft and an annular top plate portion provided on the distal end of the protrusions.

8 Claims, 5 Drawing Sheets

DOWN ← → UP

(56) References Cited

U.S. PATENT DOCUMENTS

2002/0159852 A1    10/2002  Katsuzawa et al.
2011/0204743 A1*    8/2011  Meier .................... H02K 1/148
                                                    310/216.008
2016/0167185 A1     6/2016  Nakazawa

FOREIGN PATENT DOCUMENTS

| JP | 2002369445 A | 12/2002 |
|----|--------------|---------|
| JP | 3806312 B2   | 8/2006  |
| JP | 2014233117 A | 12/2014 |
| JP | 2015117711 A | 6/2015  |
| JP | 2016112657 A | 6/2016  |
| JP | 5980891 B2   | 8/2016  |

OTHER PUBLICATIONS

English Abstract for Japanese Publication No. 3806312 B2, published Aug. 9, 2006, 2 pgs.
English Abstract and Machine Translation for Japanese Publication No. 2015-117711 A, published Jun. 25, 2015, 12 pgs.
English Abstract and Machine Translation for Japanese Publication No. 2014-233117 A, published Dec. 11, 2014, 13 pgs.
English Machine Translation for Japanese Publication No. 55-080520 U, published Jun. 3, 1980, 4 pgs.
English Machine Translation of Japanese Publication No. 2002-321138 A, published Nov. 5, 2002, 16 pgs.
English Abstract and Machine Translation for Japanese Publication No. 2016-112657 A, published Jun. 23, 2016, 26 pgs.
English Abstract and Machine Translation for Japanese Publication No. 2002-369445 A, published Dec. 20, 2002, 18 pgs.

* cited by examiner

MOTOR AND SPINDLE PROTECTION STRUCTURE

CROSS-REFERENCE TO RELATED APPLICATION

This application is based upon and claims the benefit of priority from Japanese Patent Application No. 2017-207084 filed on Oct. 26, 2017, the contents of which are incorporated herein by reference.

BACKGROUND OF THE INVENTION

Field of the Invention

The present invention relates to a motor to which a rotary joint supporting structure is attached as well as relating to a spindle protection structure having a motor and a rotary joint supporting structure.

Description of the Related Art

As disclosed in Japanese Patent No. 3806312, in a conventional spindle protection structure, a plurality of cutouts are formed in a portion of the outer peripheral surface of a rotary joint attachment housing for supporting a rotary joint, the portion facing a flinger integrally attached to a rotor shaft of a motor. Thereby, it is possible to discharge out of the rotary joint attachment housing the coolant that is scattered away by the flinger.

SUMMARY OF THE INVENTION

However, in Japanese Patent No. 3806312, it is necessary to provide a plurality of cutouts in the rotary joint attachment housing, whereby the structure of the rotary joint attachment housing has become complicated. Therefore, the rotary joint supporting structure having a rotary joint and a rotary joint attachment housing has required high manufacturing costs.

It is therefore an object of the present invention to provide a motor and a spindle protection structure that can suppress the manufacturing costs of a rotary joint supporting structure.

A first aspect of the present invention resides in a motor for turning a spindle, to which a rotary joint supporting structure for supporting a rotary joint is attached, includes: a motor housing; a rotary shaft that is hollow and penetrates through the motor housing in an axial direction of the spindle; a flinger that is integrally attached to the rotary shaft outside the motor housing and on a side where the rotary joint supporting structure is attached; and a peripheral wall that is provided in the motor housing and projects in an axial direction of the rotary shaft so as to surround a periphery of the flinger, wherein the peripheral wall is configured to have a plurality of cutouts formed in a side surface thereof so as to establish communication between the interior and exterior of the peripheral wall, to thereby form a plurality of protrusions projecting in the axial direction of the rotary shaft and an annular top plate portion provided on a distal end of the protrusions.

A second aspect of the present invention resides in a spindle protection structure having a motor for turning a spindle and a rotary joint supporting structure supporting a rotary joint, wherein: the motor comprises: a motor housing; a rotary shaft that is hollow and penetrates through the motor housing in an axial direction of the spindle, a flinger that is integrally attached to the rotary shaft outside the motor housing and on a side where the rotary joint supporting structure is attached, and a peripheral wall that is provided in the motor housing and projects in an axial direction of the rotary shaft so as to surround the periphery of the flinger; the peripheral wall is configured to have a plurality of cutouts formed in a side surface thereof so as to establish communication between the interior and exterior of the peripheral wall, to thereby form a plurality of protrusions projecting in the axial direction of the rotary shaft and an annular top plate portion provided on a distal end of the multiple protrusions; the rotary joint supporting structure comprises: the rotary joint including a rotating side member that has a passage hole and is attached to the rotary shaft, and a fixed side member that has a passage hole and is arranged across from the rotating side member, and a rotary joint housing that accommodates at least the rotating side member of the rotary joint and supports at least the fixed side member, wherein the rotary joint housing is attached to the top plate portion.

According to the present invention, the manufacturing cost of the rotary joint supporting structure can be reduced.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A motor and a spindle protection structure according to the present invention will be detailed hereinbelow by describing a preferred embodiment with reference to the accompanying drawings.

Figure 1:
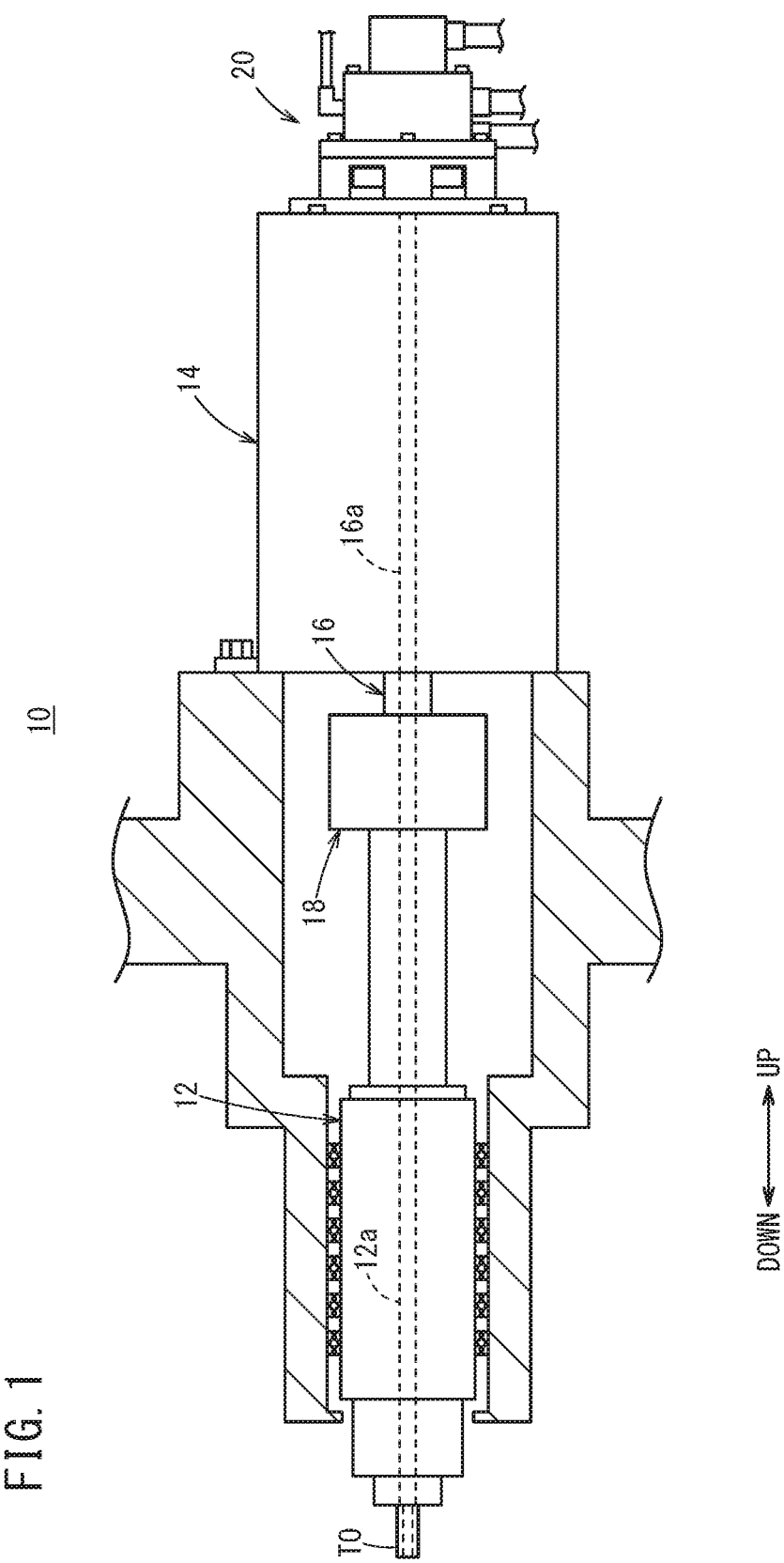
FIG. 1 is a view showing a spindle protection structure in a spindle-through coolant system.

FIG. 1 is a view showing a spindle protection structure 10 in a spindle-through coolant system. The spindle protection structure 10 includes a rotatably supported spindle 12, a motor 14, a coupling 18 that connects the spindle 12 and a rotary shaft 16 of the motor 14, and a rotary joint supporting structure 20. The spindle 12 and the rotary shaft 16 are hollow such that passage holes 12a and 16a are formed therein, respectively. The passage holes 12a and 16a communicate with each other. The rotary joint supporting structure 20 is attached to the motor 14 on the side opposite from the spindle 12 side. Coolant is supplied from the rotary joint supporting structure 20 to the passage hole 16a of the rotary shaft 16 of the motor 14. The coolant supplied to the passage hole 16a of the rotary shaft 16 passes through the passage hole 12a of the spindle 12 and is ejected from a tool TO attached to the distal end of the spindle 12. In the following description, the up and down directions will be described as indicated by the arrows shown in FIG. 1.

Figure 2:
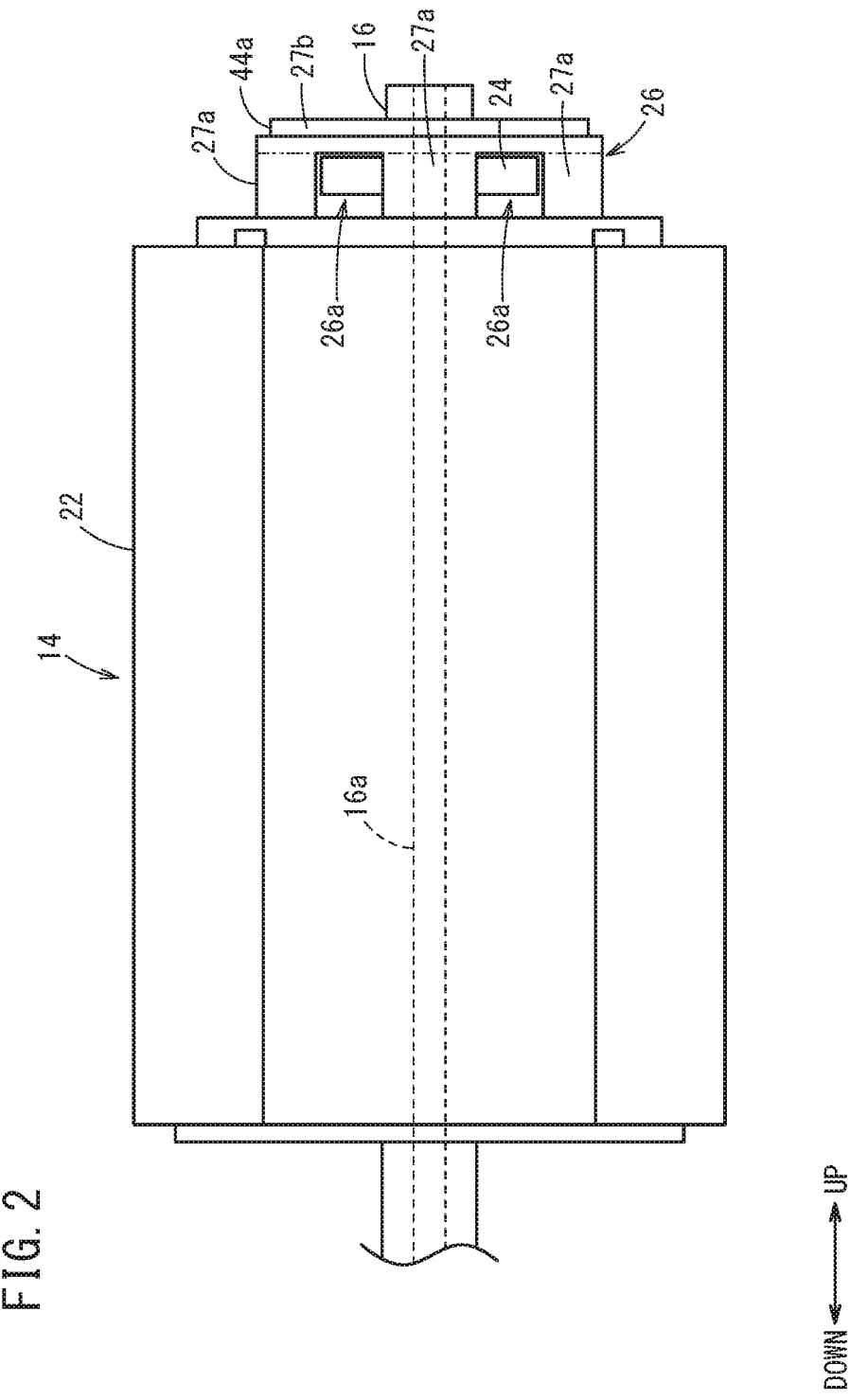
FIG. 2 is an external side view of a motor.
Figure 3:
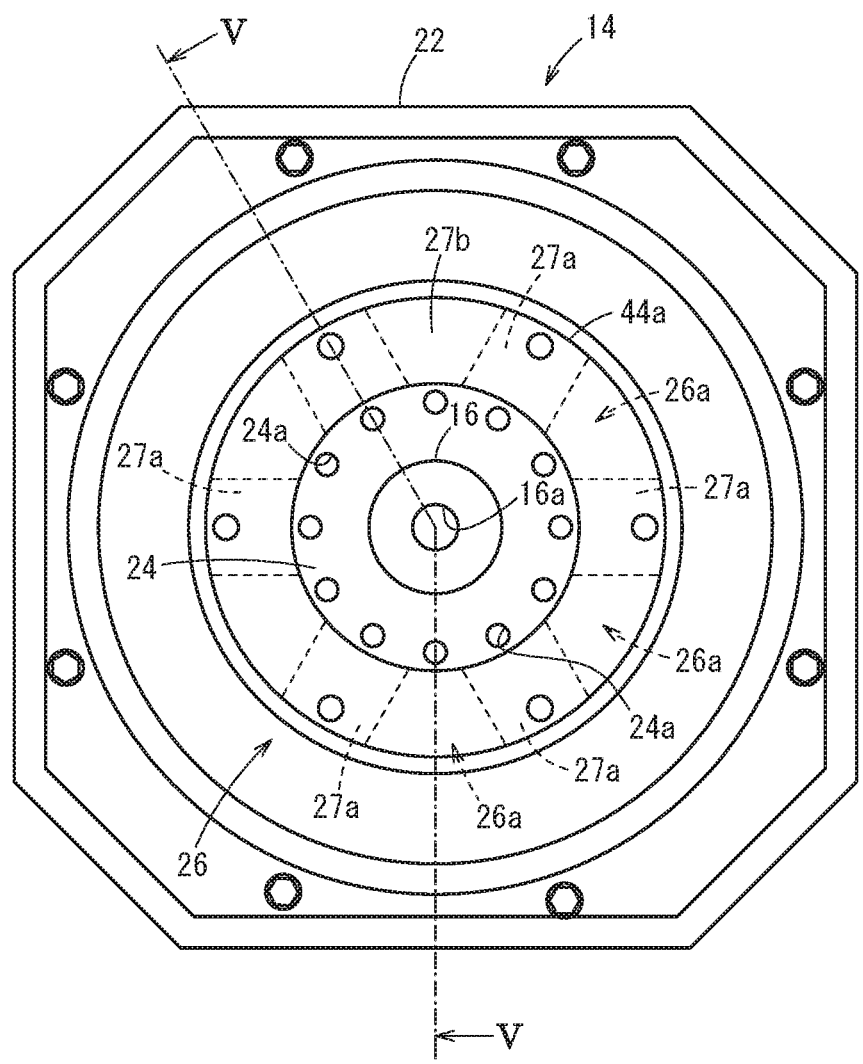
FIG. 3 is an external rear view of a motor as viewed from the side where a rotary joint supporting structure is attached.

Next, a specific configuration of the motor 14 will be described with reference to FIGS. 2 and 3. FIG. 2 is an external side view of the motor 14, and FIG. 3 is an external rear view of the motor 14 as viewed from the side (upper side) where the rotary joint supporting structure 20 is attached. The motor 14 has a motor housing 22 and a rotary shaft 16 penetrating the motor housing 22 in the axial direction of the spindle 12.

A disc-shaped flinger 24 is integrally attached to the rotary shaft 16. The flinger 24 is attached to the rotary shaft 16 on the side to which the rotary joint supporting structure 20 is attached and outside the motor housing 22. That is, the flinger 24 is attached to the rotary shaft 16 on the upper side of the motor housing 22. The flinger 24 rotates together with the rotary shaft 16.

Figure 5:
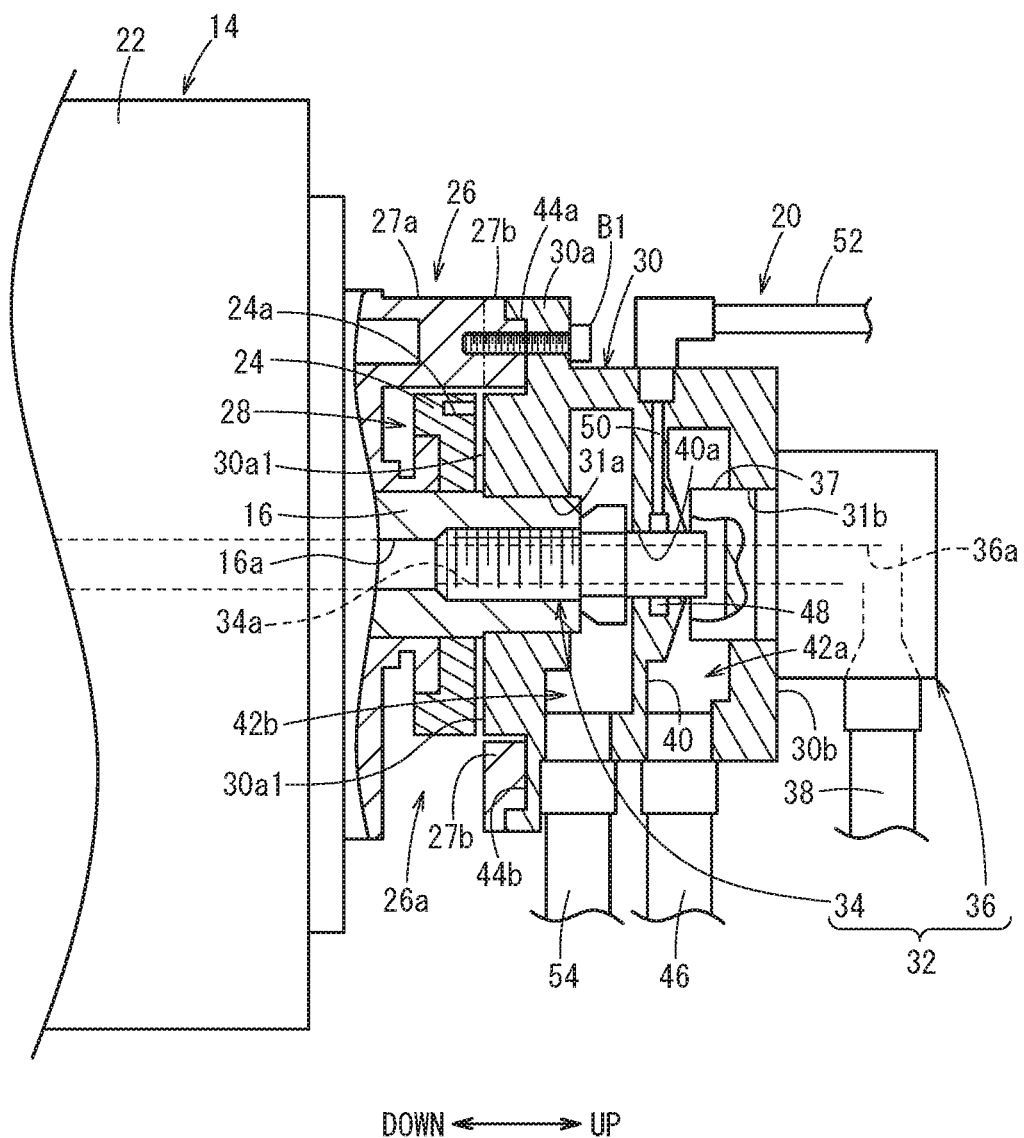
FIG. 5 is a partial sectional view of a rotary joint supporting structure attached to a motor.

A plurality of holes 24a are formed along the axial direction of the rotary shaft 16 on the upper surface of the flinger 24 (see also FIG. 5). The multiple holes 24a are arranged along the circumferential direction of the flinger 24. It is preferable that the multiple holes 24a are arranged concentrically with the flinger 24 in an equiangular manner (at equal intervals).

Provision of the multiple holes 24a makes it possible to prevent the rotational balance of the rotary shaft 16 from being affected. That is, if the center of gravity of the rotary shaft 16 and the member rotating together with the rotary shaft 16 deviates from the rotational center of the rotary shaft 16, the rotation of the rotary shaft 16 becomes unbalanced. Therefore, by inserting a weight in at least one of the multiple holes 24a, it is possible to make the position of the center of gravity of the rotary shaft 16 and the member rotating together with the rotary shaft 16 coincide with the rotational center of the rotary shaft 16. The hole 24a may be a tap hole into which a screw as a weight can be screwed.

The motor housing 22 is provided with a peripheral wall 26 projecting upward in the axial direction of the spindle 12 (rotary shaft 16) so as to surround the periphery of the flinger 24. The peripheral wall 26 has an annular shape surrounding the entire circumference of the flinger 24. Therefore, when the motor 14 is viewed from above, the flinger 24 is exposed without being shielded by the peripheral wall 26. This facilitates insertion of the weight into the hole 24a of the flinger 24.

Figure 4:
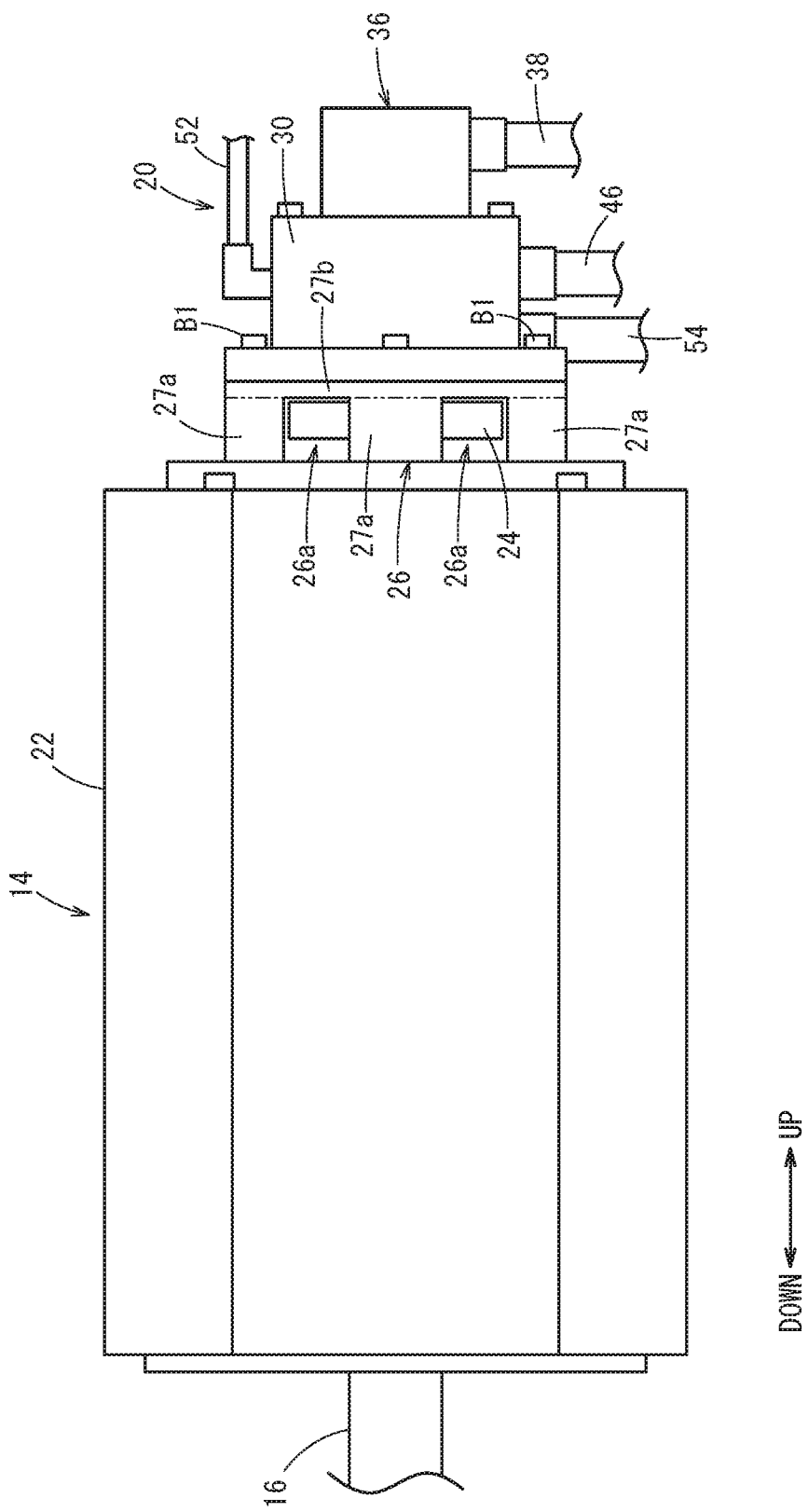
FIG. 4 is an external side view of a motor to which a rotary joint supporting structure is attached.

On the side surface of the peripheral wall 26, a plurality of cutouts 26a are formed so as to establish communication between the exterior (the outer peripheral surface, the outside) and the interior (the inner peripheral surface, the inside) of the peripheral wall 26. On account of the multiple cutouts 26a, the peripheral wall 26 is formed of a plurality of protrusions 27a protruding upward in the axial direction of the rotary shaft 16 and an annular top plate portion 27b formed on the distal ends (top) of the multiple protrusions 27a. In FIG. 2 and FIGS. 4 and 5 described below, in order to facilitate distinction between the protrusions 27a and the top plate portion 27b, a boundary line between the protrusions 27a and the top plate portion 27b is indicated by a two-dot chain line.

FIG. 4 is an external side view of the motor 14 to which the rotary joint supporting structure 20 is attached, and FIG. 5 is a partial sectional view of the rotary joint supporting structure 20 attached to the motor 14. FIG. 5 is a cross sectional view taken along the line V-V of FIG. 3.

The rotary joint supporting structure 20 (a rotary joint housing 30 of the rotary joint supporting structure 20) is detachably attached to the top plate portion 27b of the peripheral wall 26. The rotary joint supporting structure 20 (the rotary joint housing 30) is attached to the upper surface of the top plate portion 27b by bolts B1. By attaching the rotary joint supporting structure 20 (the rotary joint housing 30) to the top plate portion 27b of the peripheral wall 26 of the motor 14, it is possible to accommodate the flinger 24 in a space 28 defined by the motor housing 22, the peripheral wall 26, and the rotary joint supporting structure 20 (the rotary joint housing 30).

A rotary joint 32 of the rotary joint supporting structure 20 includes a rotating side member 34 having a passage hole 34a therein and attached to the rotary shaft 16, and a fixed side member 36 arranged along the axial direction of the rotary shaft 16 and across from the rotating side member 34. The rotating side member 34 is screw-fitted to a screw threaded on the upper end portion of the passage hole 16a of the rotary shaft 16 and fixed to the rotary shaft 16 so as to rotate integrally with the rotary shaft 16. The passage hole 16a of the rotary shaft 16 and the passage hole 34a of the rotating side member 34 communicate with each other. The fixed side member 36 has a socket 37 which is in sliding contact with the rotating side member 34. A coolant supply pipe 38 is connected to the side surface of the fixed side member 36. The coolant supplied from the pipe 38 passes through the passage hole 36a of the fixed side member 36, reaches the socket 37, passes through the passage hole 34a of the rotating side member 34 that is in sliding contact with the socket 37, and flows into the passage hole 16a of the rotary shaft 16.

The rotary joint housing 30 at least accommodates the rotating side member 34 and at least supports the fixed side member 36. The rotary joint housing 30 has a substantially cylindrical outward form, and the bottom wall, designated at 30a, is attached to the top plate portion 27b of the peripheral wall 26 by bolts B1. The rotary joint housing 30 is divided into two air chambers 42a and 42b in the vertical direction by a partition wall 40.

A fitting portion 44a fitted to the bottom wall 30a of the rotary joint housing 30 by means of the spigot-and-socket jointing is formed in the top plate portion 27b of the peripheral wall 26 while a depressed portion 44b to be fitted with the fitting portion 44a is formed in the bottom wall 30a of the rotary joint housing 30. This arrangement facilitates the positioning of the rotary joint supporting structure 20 (the rotary joint housing 30) with respect to the motor 14 (the peripheral wall 26), whereby the rotary joint supporting structure 20 (the rotary joint housing 30) can be easily attached to the motor 14 (the peripheral wall 26). In this way, since the annular top plate portion 27b is provided with the fitting portion 44a formed on the top plate portion 27b, the formation of the fitting portion 44a becomes easy.

Formed on the bottom wall 30a is a circular bulged portion 30a1 projecting downward inside the inner peripheral surface of the peripheral wall 26 (the top plate portion 27b) so as to face the flinger 24. Because of making the outer periphery of the bulged portion 30a1 and the inner periphery of the peripheral wall 26 substantially coincident with each other, the peripheral wall 26 and the bulged portion 30a1 also facilitates the positioning of the rotary joint supporting structure 20 (the rotary joint housing 30) with respect to the motor 14 (the peripheral wall 26). Thus, the rotary joint supporting structure 20 (the rotary joint housing 30) can be easily attached to the motor 14 (the peripheral wall 26).

The bottom wall 30a has a through hole 31a in a central portion thereof to allow the rotary shaft 16 to penetrate therethrough. The distal end (upper end) of the rotary shaft 16 extends through the through hole 31a to the air chamber 42b inside the rotary joint housing 30. The partition wall 40 has a through hole 40a allowing penetration of the rotating side member 34. The rotating side member 34 attached to the rotary shaft 16 extends through the through hole 40a to the air chamber 42a located in the rotary joint housing 30. That is, the rotating side member 34 is provided stretching from the air chamber 42b to the air chamber 42a.

The upper wall, designated at 30b, of the rotary joint housing 30 has a through hole 31b in a central portion thereof allowing penetration of the socket 37. The fixed side member 36 is fixed to the upper surface side of the upper wall 30b of the rotary joint housing 30 so that the socket 37 is inserted through the through hole 31b into the air chamber 42a. Thus, the distal end portion of the rotating side member 34 and the socket 37 of the fixed side member 36 are accommodated in the air chamber 42a.

Since coolant may leak through the gap between the rotating side member 34 and the socket 37, a drain pipe 46 is connected to the side surface of the air chamber 42a. This makes it possible to discharge the coolant leaking through the gap between the rotating side member 34 and the socket 37 to the outside of the rotary joint housing 30. In addition, by forming the upper surface of the partition wall 40 around the through hole 40a so as to gently protrude upward, the leaked coolant can be guided to the outer periphery of the air chamber 42a and easily discharged from the drain pipe 46.

An annular groove 48 is formed on the interior surface of the through hole 40a of the partition wall 40 while a passage hole 50 extending radially outward from the annular groove 48 is formed in the partition wall 40. The passage hole 50 is connected to an air purge pipe 52 arranged on the side of the air chamber 42a. Supplying compressed air from the outside through the air purge pipe 52 to the passage hole 50 and the annular groove 48 makes it possible to easily discharge the leaking coolant from the drain pipe 46.

An auxiliary drain pipe 54 is connected to the side surface of the air chamber 42b in order to deal with a case where the coolant cannot sufficiently be discharged from the air chamber 42a and enters the air chamber 42b.

The flinger 24 prevents the coolant that has not been able to be sufficiently discharged from the air chamber 42b and has entered into the space 28, from penetrating into the interior of the motor 14. The flinger 24 rotates together with the rotary shaft 16 of the motor 14 so as to scatter away the coolant radially outward by centrifugal force. Since multiple cutouts 26a are formed in the peripheral wall 26, the coolant that is scattered radially outward by the flinger 24 is discharged to the outside through the cutouts 26a.

In this way, since the flinger 24 is attached to the rotary shaft 16 of the motor 14 while the motor housing 22 is provided with the peripheral wall 26 having multiple cutouts 26a, it is no longer necessary to form any cutouts 26a in the rotary joint housing 30. Therefore, it is possible to simplify the structure of the rotary joint housing 30 and reduce the manufacturing costs of the rotary joint housing 30. As a result, the manufacturing costs of the rotary joint supporting structure 20 can be reduced.

In particular, since the flinger 24 is housed in the space 28 formed by the motor housing 22, the peripheral wall 26, and the rotary joint housing 30, the rotary joint housing 30 will not extend downward beyond the flinger 24. Therefore, it is no longer possible to form cutouts 26a in the rotary joint housing 30.

Technical Idea Obtained from Embodiment

Technical ideas that can be grasped from the above embodiment will be described below.
<First Technical Idea>

The motor (14) to which the rotary joint supporting structure (20) for supporting the rotary joint (32) is attached, turns the spindle (12). The motor (14) includes: the motor housing (22); the rotary shaft (16) that is hollow and penetrates through the motor housing (22) in the axial direction of the spindle (12); the flinger (24) that is integrally attached to the rotary shaft outside the motor housing and on the side where the rotary joint supporting structure (20) is attached; and a peripheral wall (26) that is provided in the motor housing (22) and projects in the axial direction of the rotary shaft (16) so as to surround the periphery of the flinger (24). The peripheral wall (26) is configured to have a plurality of cutouts (26a) formed in the side surface thereof so as to establish communication between the interior and exterior of the peripheral wall (26), to thereby form a plurality of protrusions (27a) projecting in the axial direction of the rotary shaft (16) and an annular top plate portion (27b) provided on the distal end of the protrusions (27a).

Since the peripheral wall (26) having cutouts (26a) is thus provided in the motor housing (22), it is no longer necessary to form cutouts (26a) in the rotary joint housing (30) of the rotary joint supporting structure (20), and the structure of the rotary joint housing (30) can be simplified. As a result, it is possible to reduce the manufacturing costs of the rotary joint housing (30), and hence the costs of the rotary joint supporting structure (20).

The flinger (24) may have a plurality of holes (24a) into which the weight is put to adjust the rotational balance of the rotary shaft (16) is formed along the axial direction of the rotary shaft (16) on the surface of the flinger, the surface facing towards the side where the rotary joint supporting structure (20) is attached. This makes it possible to adjust the rotational balance of the rotary shaft (16). In addition, since the flinger (24) is not shielded by the peripheral wall (26), weights can be easily put into holes (24a).

The rotary joint supporting structure (20) may be configured to be detachably attached to the top plate portion (27b). The flinger (24) may be configured to be accommodated in a space (28) defined by the motor housing (22), the peripheral wall (26) and a rotary joint housing (30) of the rotary joint supporting structure (20). As a result, it is possible to reduce the manufacturing costs of the rotary joint housing (30), and hence the manufacturing costs of the rotary joint supporting structure (20).

The top plate portion (27b) may be provided with the fitting portion (44a) that is fitted with the rotary joint housing (30) of the rotary joint supporting structure (20). This configuration facilitates the positioning of the rotary joint supporting structure (20) to the motor (14), whereby the rotary joint supporting structure (20) can be easily attached to the motor (14). Further, since the fitting portion (44a) is formed on the top plate portion (27b), the formation of the fitting portion (44a) becomes easy.
<Second Technical Idea>

The spindle protection structure (10) has the motor (14) for turning the spindle (12) and the rotary joint supporting structure (20) supporting the rotary joint (32). The motor comprises: the motor housing (22), the rotary shaft (16) that is hollow and penetrates through the motor housing (22) in the axial direction of the spindle, the flinger (24) that is integrally attached to the rotary shaft outside the motor housing and on the side where the rotary joint supporting structure (20) is attached, and a peripheral wall (26) that is provided in the motor housing (22) and projects in the axial direction of the rotary shaft (16) so as to surround the periphery of the flinger (24). The peripheral wall (26) is configured to have a plurality of cutouts (26a) formed in the side surface so as to establish communication between the interior and exterior of the peripheral wall (26), to thereby form a plurality of protrusions (27a) projecting in the axial direction of the rotary shaft (16) and an annular top plate portion (27b) provided on the distal end of the protrusions (27a). The rotary joint supporting structure (20) comprises: the rotary joint (32) including the rotating side member (34) that has the passage hole (34a) and is attached to the rotary shaft (16) and the fixed side member (36) that has the passage hole (36a) and is arranged across from the rotating side member (34), and the rotary joint housing (30) that accommodates at least the rotating side member (34) of the rotary joint (32) and supports at least the fixed side member (36). The rotary joint housing (30) is attached to the top plate portion (27b).

Since the peripheral wall (26) having cutouts (26a) is thus provided in the motor housing (22), it is no longer necessary to form cutouts (26a) in the rotary joint housing (30) of the rotary joint supporting structure (20), and the structure of the rotary joint housing (30) can be simplified. As a result, it is possible to reduce the manufacturing costs of the rotary joint housing (30), and hence the costs of the rotary joint supporting structure (20).

A plurality of holes (24a) into which the weight is put to adjust the rotational balance of the rotary shaft (16) is formed along the axial direction of the rotary shaft (16) on the surface of the flinger, the surface facing towards the side where the rotary joint supporting structure (20) is attached. This makes it possible to adjust the rotational balance of the rotary shaft (16). In addition, since the flinger (24) is not shielded by the peripheral wall (26), weights can be easily put into holes (24a).

The top plate portion (27b) may be provided with the fitting portion (44a) that is fitted with the rotary joint housing (30). This configuration facilitates the positioning of the rotary joint supporting structure (20) to the motor (14), whereby the rotary joint supporting structure (20) can be easily attached to the motor (14). Further, since the fitting portion (44a) is formed on the top plate portion (27b), the formation of the fitting portion (44a) becomes easy.

The flinger (24) may be configured to be accommodated in a space (28) defined by the motor housing (22), the peripheral wall (26) and the rotary joint housing (30). As a result, it is possible to reduce the manufacturing costs of the rotary joint housing (30), and hence the manufacturing costs of the rotary joint supporting structure (20).

The present invention is not limited to the above-described embodiment, and various modifications can be made

What is claimed is:

1. A motor for turning a spindle, comprising:
a motor housing;
a rotary shaft that is hollow and penetrates through the motor housing in an axial direction of the spindle;
a flinger that is integrally attached to the rotary shaft outside the motor housing;
a peripheral wall that is provided in the motor housing and projects in an axial direction of the rotary shaft so as to surround a periphery of the flinger; and
a rotary joint housing that supports a rotary joint,
wherein the peripheral wall is configured to have a plurality of cutouts formed in a side surface thereof so as to establish communication between the interior and exterior of the peripheral wall, to thereby form a plurality of protrusions projecting in the axial direction of the rotary shaft and an annular top plate portion that is provided on a distal end of the protrusions, the rotary joint housing includes a bottom wall that directly faces the flinger and includes a through hole wherein the rotary shaft penetrates through the through hole,
the top plate portion of the peripheral wall and the bottom wall of the rotary joint housing are detachably connected with each other.

2. The motor according to claim 1, wherein a plurality of holes into which a weight is put to adjust a rotational balance of the rotary shaft is formed along the axial direction of the rotary shaft on a surface of the flinger, the surface facing the bottom wall.

3. The motor according to claim 1, wherein:
the flinger is configured to be accommodated in a space defined by the motor housing, the peripheral wall, and the bottom wall.

4. The motor according to claim 1, wherein the top plate portion is provided with a fitting portion that is fitted with the bottom wall.

5. A spindle protection structure having a motor for turning a spindle and a rotary joint supporting structure supporting a rotary joint, wherein:
the motor comprises: a motor housing, a rotary shaft that is hollow and penetrates through the motor housing in an axial direction of the spindle, a flinger that is integrally attached to the rotary shaft outside the motor housing, and a peripheral wall that is provided in the motor housing and projects in an axial direction of the rotary shaft so as to surround a periphery of the flinger;
the peripheral wall is configured to have a plurality of cutouts formed in a side surface thereof so as to establish communication between the interior and exterior of the peripheral wall, to thereby form a plurality of protrusions projecting in the axial direction of the rotary shaft and an annular top plate portion that is provided on a distal end of the protrusions;
the rotary joint supporting structure comprises
the rotary joint including
a rotating side member that has a passage hole and is attached to the rotary shaft, and
a fixed side member that has a passage hole and is arranged across from the rotating side member, and
a rotary joint housing that accommodates the rotating side member of the rotary joint and supports the fixed side member,
wherein the rotary joint housing includes
a bottom wall that directly faces the flinger and includes a through hole wherein the rotary shaft penetrates through the through hole,
the top plate portion of the peripheral wall and the bottom wall of the rotary joint housing are detachably connected with each other.

6. The spindle protection structure according to claim 5, wherein a plurality of holes into which a weight is put to adjust a rotational balance of the rotary shaft is formed along the axial direction of the rotary shaft on a surface of the flinger, the surface facing the bottom wall.

7. The spindle protection structure according to claim 5, wherein the top plate portion is provided with a fitting portion that is fitted with the the bottom wall.

8. The spindle protection structure according to claim 5, wherein the flinger is configured to be accommodated in a space defined by the motor housing, the peripheral wall, and the bottom wall.

* * * * *